United States Patent [19]
Claucherty

[11] Patent Number: 6,113,328
[45] Date of Patent: Sep. 5, 2000

[54] TIE-DOWN DEVICE

[75] Inventor: Burrell Stewart Claucherty, Jackson, Mich.

[73] Assignee: Manchester Stamping Corporation, Manchester, Mich.

[21] Appl. No.: 09/217,180

[22] Filed: Dec. 21, 1998

[51] Int. Cl.[7] .................................................. B60P 7/08
[52] U.S. Cl. ......................... 410/106; 410/110; 410/116
[58] Field of Search ................................... 410/101, 106, 410/110, 116; 24/129 B, 115 K; 248/499; 114/218

[56] References Cited

U.S. PATENT DOCUMENTS

| | | | |
|---|---|---|---|
| 2,836,141 | 5/1958 | Brydon | 114/218 |
| 3,948,203 | 4/1976 | Matthews | 114/218 |
| 4,191,108 | 3/1980 | Jones | 410/110 |
| 4,418,450 | 12/1983 | Nelson | 410/106 X |
| 5,553,981 | 9/1996 | Braden | 410/116 |
| 5,676,508 | 10/1997 | Weicht | 410/101 |
| 5,738,471 | 4/1998 | Zentner et al. | 410/110 |

*Primary Examiner*—Stephen T. Gordon
*Attorney, Agent, or Firm*—Harness, Dickey & Pierce P.L.C.

[57] ABSTRACT

A tie-dowm device that includes, a cleat, and a neck, all integrally connected at an angle of about 125°. The base defines two holes adapted to receive bolts attaching the device to a vehicle. The cleat includes two arms and defines a triangle-shaped ayalet, with a width greater than the width of the neck. The base, the cleat, and the neck are integrally formed and stamped from a single piece of metallic material.

10 Claims, 3 Drawing Sheets

TIE-DOWN DEVICE

TECHNICAL FIELD OF THE INVENTION

This invention generally relates to tie-down devices. More specifically, this invention relates to tie-down devices that are stamped from a single piece of metallic material.

BACKGROUND

Tie-down devices have been widely used for many years for receiving a line to secure an object in or on a vehicle. Although often used successfully, there are several problems and disadvantages with the tie-down devices of the conventional techniques in the art.

One of the problems of the conventional techniques is the orientation of the eyelet. In many devices, the eyelet is positioned in a plane perpendicular to the surface of the vehicle. Although this positioning allows a preferred orientation of the device and the line in some situations, the tie-down devices are most often used at the edge of a vehicle where this upward position is not preferred. An upward orientation at the edge of a vehicle puts an undue strain on a line and may cause durability and reliability problems.

another problem of the conventional techniques is the manufacturing costs. Many tie-down devices are forged, using an expensive manufacturing process. These manufacturing costs are, unfortunately, passed down to the customer. With relatively high costs, a customer is easily discouraged from purchasing several tie-down devices, which, if bought, would increase their cargo flexibility.

A further problem of the conventional techniques arises when a line is fastened to a tie-down device so tightly that it cannot be loosen. Many tie-down devices either block the fastening bolts, or rotate onto a stake. Both of these types of devices prevent a customer from removing the tie-down from the vehicle, while the device is receiving a taut line, to ease in the removal of the line.

SUMMARY OF THE INVENTION

Accordingly, this invention provides for a tie-down device that overcomes the problems and disadvantages of the conventional techniques in the art. The present invention also provides for an anchoring of an object to a vehicle that is more durable and reliable than the conventional techniques in the art. Additionally, the present invention provides for a tie-down device that reduces manufacturing costs, allowing a customer to increase their cargo flexibility with a greater number of attachment points for the same total cost. Further, the present invention provides for a tie-down device that eliminates the problem of a line fastened so tight that it cannot be loosen.

Briefly, the invention includes tie-down device that include a base, a cleat, and a neck, all integrally connected at an angle of about 125°. The cleat includes two arms and defines a triangle-shaped eyelet, with a width greater than the width of the neck. Because the tie-down device of the present invention includes an eyelet shaped like a triangle, set at an angle, and formed wider than the neck of the tie-down device, the device is optimized to receive a taut line having a greater diameter, without including a pinch point in the line. This feature of the present invention allows an anchoring of an object to a vehicle that is durable and reliable.

The present invention also includes a base, a cleat, and a neck that are integrally formed and stamped from a single piece of metallic material. This feature of the present invention reduces manufacturing costs, allowing a customer to increase their cargo flexibility with a greater number of attachment points.

Further, the present invention includes a tie-down device with a base defining two holes adapted to receive bolts attaching the device to a vehicle. Because the cleat is tilted away from the base at an angle, these bolts may be removed from the holes, and the device detached from a vehicle, while the cleat receives a taut line. This feature of the present invention eliminates the problem of a line fastened so tight that it cannot be loosen.

Further features and advantage of the invention will become apparent from the following discussion and accompanying drawings.

DETAILED DESCRIPTION OF THE PREFERRED EMBODIMENT

The following description of the preferred embodiment is merely exemplary in nature, and is in no way intended to limit the invention, or its application or uses.

Figure 2:
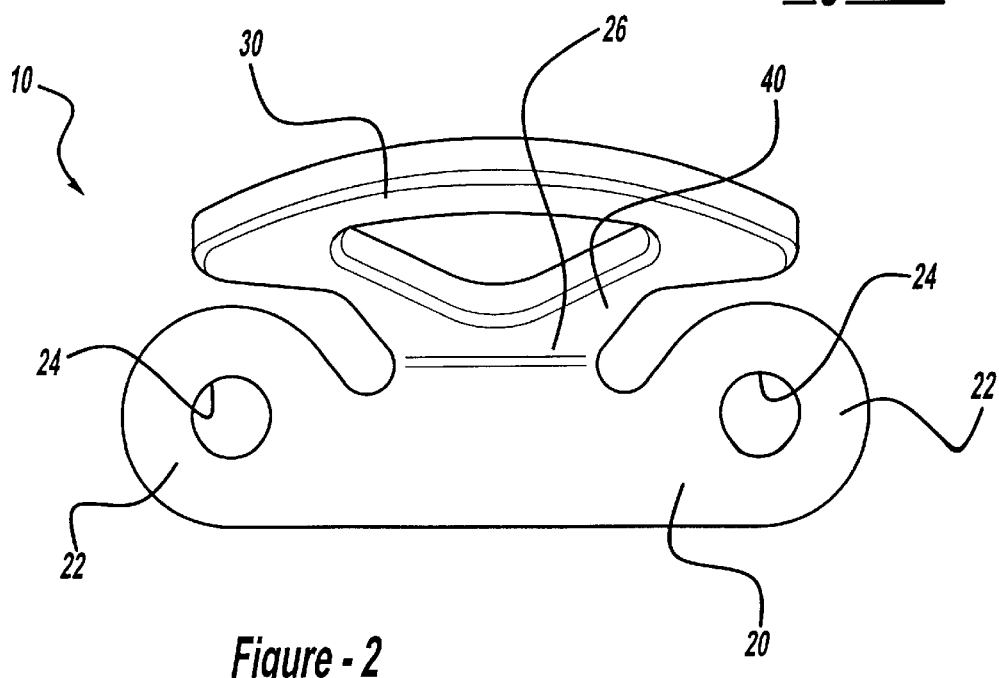
FIG. 2 is a view of the tie-down device according to the present invention.

The tie-down device 10 of the present invention is shown in FIG. 2. The device 10 generally includes a base 20, a cleat 30, and a neck 40.

The base 20 is a substantially flat member of high-strength material, but not limited to alternate materials such as low carbon steel, stainless steel, brass, aluminum, and plastic, that includes two ends 22, as shown in FIG. 2. Near both ends 22, the base 20 defines two holes 24, which are adapted to receive bolts. In an alternate embodiment of the present invention, the base 20 might not includes ends 22, but rather may define a circular shape without any ends; the ends 22 would simply define opposing sides of circular shape in this situation. Further alternate embodiments may define three or more holes 24 adapted to receive bolts. In the preferred embodiment of the present invention, the base 20 includes an edge 26 where the base 20 bends upward to meet the cleat 30.

Figure 3:
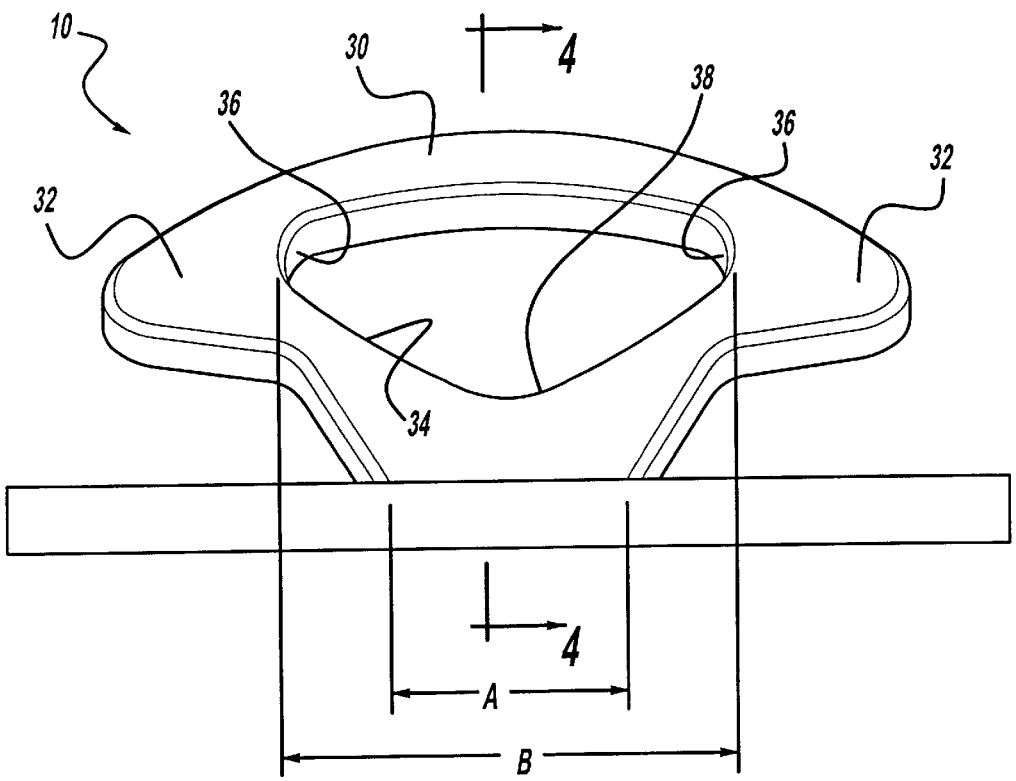
FIG. 3 is a front elevation of the tie-down device of FIG. 2.

The cleat 30 is also a substantially flat member of high-strength material, but not limited to alternate materials such as low carbon steel, stainless steel, brass, aluminum, and plastic. As shown in FIG. 3, the cleat includes two arms 32, and defines a triangle-shaped eyelet 34. Both arms 32 extend outward from the cleat 30 generally along the same line. In an alternative embodiment of the present invention, the cleat 30 may include three or more arms 32. Although rounded in the drawings, the eyelet 34 defines three corners; two corners 36 point towards the arms 32, and the other corner 38 points towards the neck 40. The eyelet 34 is optically designed to receive 2 or 3 taut lines placed in the corners of the eyelet 34.

Figure 4:
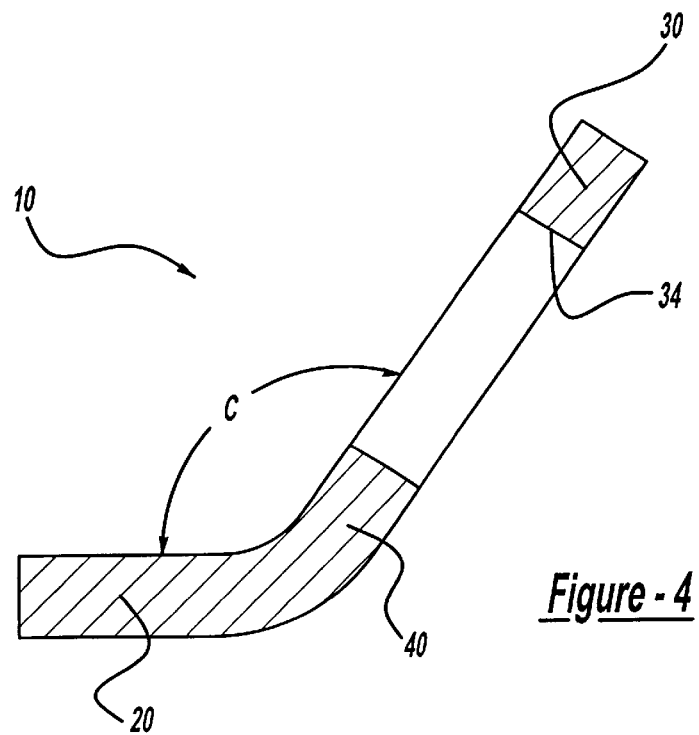
FIG. 4 is a side elevation of the tie-down device of FIG. 2.

The neck 40 integrally connects the base 20 with the cleat 30 at an angle C, as shown in FIG. 4. The angle C, as measured from the base 20 to the cleat 30, is preferably between 110° and 140°, and is most preferably about 125°. The neck 40 also defines a width A, measured at the narrowest portion of the neck 40. This width A is smaller than the width B of the eyelet 34, measured at the widest portion between the two corners 36 of the eyelet 34.

The base 20, the neck 40, and the cleat 30 of the present invention are all integrally formed and stamped from a single piece of metallic material in the preferred embodiment of the present invention. Any material with a high strength and low brittleness, such as steel, may be used in the stamping process. This element of the present invention reduces manufacturing costs, allowing a customer to increase their cargo flexibility with a greater number of attachment points for the same total cost.

Figure 1:
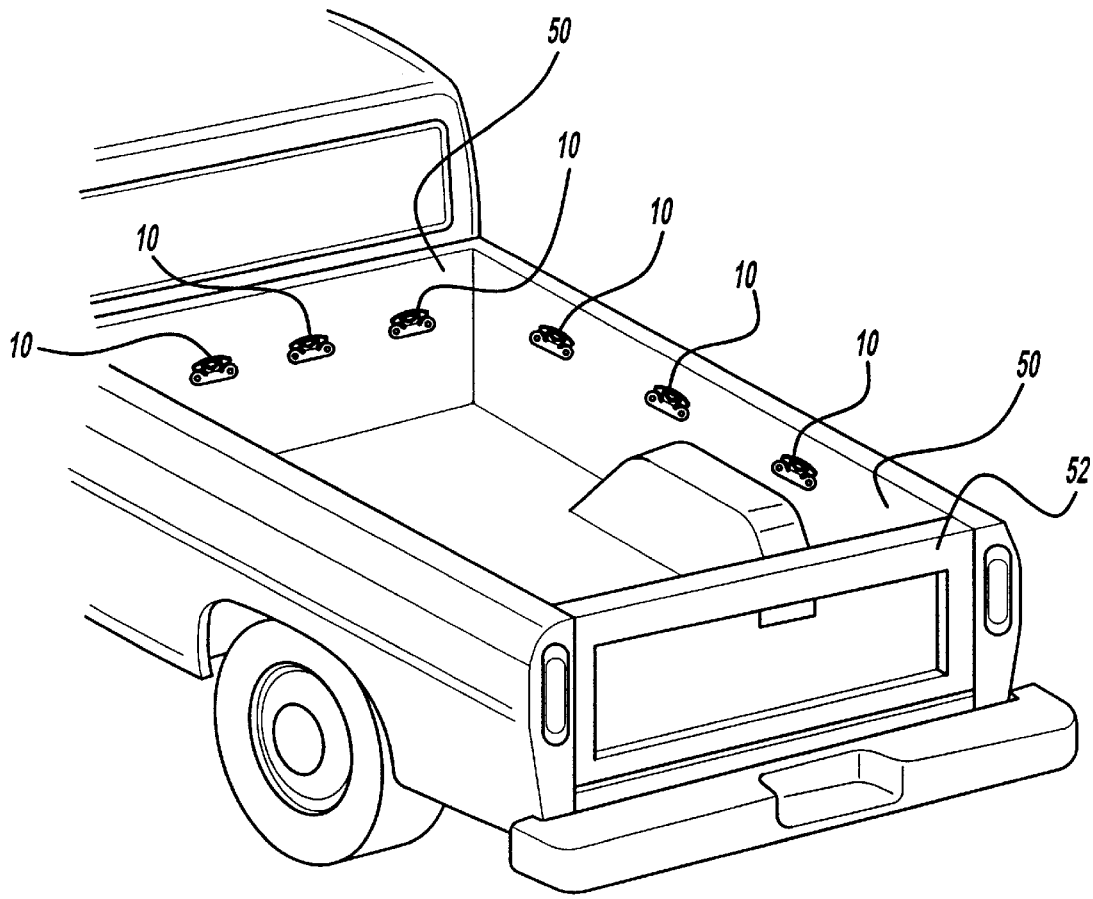
FIG. 1 is a perspective representation of several tie-down devices attached to a vehicle according to the present invention.

In the preferred embodiment of the present invention, three tie-down devices 10 are located along each interior truck bed wall 50 of the vehicle 52, as shown in FIG. 1 (only six tie-down devices are shown in the drawing). Each eyelet 34 of the tie-down devices 10 points in an upward direction. As would be readily understood by one of ordinary skill in the art, the tie-down devices 10 may be mounted in numerous orientations (with the eyelets 34 pointing downward or sideward) and in numerous positions. The numerous position include, but are not intended to be limited to, along both the interior and exterior surfaces of any vehicle, plane, boat, train, or any other area that might serve as a cargo platform to secure an object.

Figure 5:
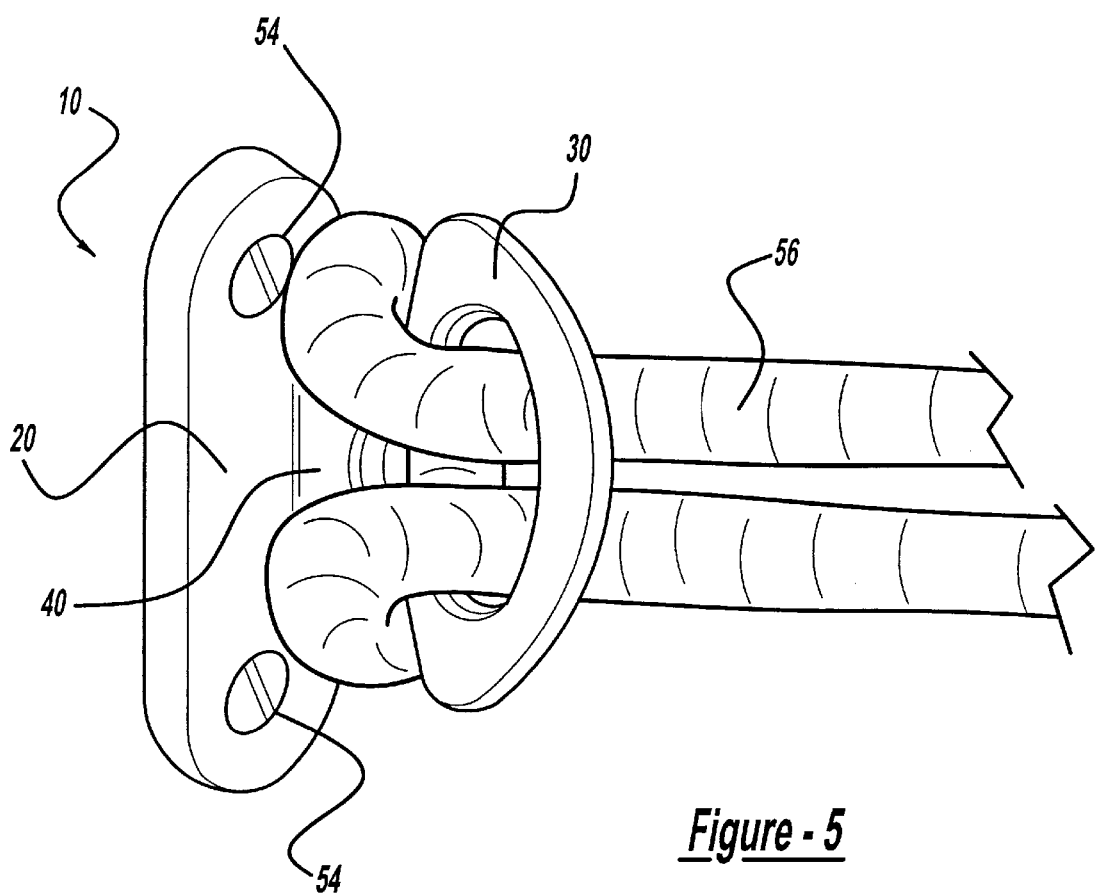
FIG. 5 is perspective representation of the tie-down device receiving a line according to the present invention.

In the operation of the present invention, two bolts 54 are inserted through the holes 24 of the base 20. As shown in FIG. 5, a line 56 is inserted from the back of the eyelet 34, through the eyelet 34, around the back of the eyelet 34 to the other side of the eyelet 34, and back through the eyelet 34 from the front of the eyelet 34. Although somewhat difficult to explain in words, this knot, known as a "hitch knot", is widely known and practiced. Both the bolt 54 and the line 56 are not intended to be limited to a simple bolt and a line. As would be readily understood by one of ordinary skill in the art, a bolt may include other forms of fastening devices, such as screws, nails, and U-shaped bolts. Further, a line may include other forms of fastening devices, such as rope, cable, chains, and carabiners.

Because the tie-down device includes an eyelet shaped like a triangle, set at an angle, and formed with a width greater than the width of the neck, the tie-down device can receive a taut line having a greater diameter, without inducing a pinch point in the line. This element of the present of the invention allows an anchoring of an object to the vehicle that is more durable and reliable. Further, because the tie-down device is adapted to receive bolts, and because the cleat is tilted away from the base at an angle, the bolts may be removed from the holes, and the device detached from a vehicle, while the cleat receives a taut line. This element of the present invention eliminates the problem of a line fastened so tight that it cannot be loosen.

The foregoing discussion discloses and describes a preferred embodiment of the present invention. One skilled in the art will readily recognize from such discussion, and from the accompanying drawings and claims, that changes and modification can be made to the invention without departing from the true spirit and fair scope of the invention as defined in the following claims.

I claim:

1. A tie-down device for a vehicle, comprising:

a base defining two holes, wherein said holes are adapted to receive bolts attaching said base to a vehicle; and a cleat integrally formed with said base, defining a triangle shaped eyelet, and having two arms, wherein said eyelet and said arms are adapted to receive a taut line securing an object to the vehicle;

such that while said cleat receives a taut line, the bolts may be removed from said holes, and said base detached from the vehicle.

2. The tie-down device of claim 1, wherein two corners of said eyelet point towards said arms.

3. The tie-down device of claim 2, wherein said two corners of said eyelet point towards said arms and one corner points towards said base.

4. A tie-down device for a vehicle, comprising:

a substantially flat base having two ends and an edge, wherein said ends define holes adapted to receive bolts;

a substantially flat cleat having two arms extending from said cleat, and defining a generally triangle-shaped eyelet with two corners pointing towards said arms; and a neck integrally connecting said base with said cleat at an angle.

5. The tie-down device of claim 4, wherein said two corners of said eyelet point towards said arms and one corner points towards said neck.

6. The tie-down device of claim 4, wherein said angle measured from said base to said cleat is between 110° and 140°.

7. The tie-down device of claim 6, wherein said angle is about 125°.

8. The tie-down device of claim 6, wherein the width of said eyelet measured from said corners pointing towards said arms is greater than the width of said neck.

9. The tie-down device of claim 6, wherein said base, said cleat, and said neck are integrally formed and stamped from a single piece of metallic material.

10. The tie-down device for a vehicle, comprising:

a substantially flat base having two ends and an edge, wherein said ends define holes adapted to receive bolts attaching said base to a vehicle;

a substantially flat cleat having two arms extending from said cleat, and defining a generally triangle-shaped eyelet with two corners pointing towards said arms and one corner pointing towards said base, wherein said eyelet and said arms are adapted to receive a taut line securing an object to the vehicle; and a neck integrally connecting said base with said cleat at an angle measured from said base to said cleat of between 110° and 140°, wherein the width of said eyelet measured from said corners pointing towards said arms is greater than the width of said neck;

wherein said base, said cleat, and said neck are integrally formed and stamped from a single piece of metallic material, and such that while said cleat receives a taut line, the bolts may be removed from said holes, and said base detached from the vehicle.

* * * * *